US012614861B2

(12) United States Patent
Cho et al.

(10) Patent No.: US 12,614,861 B2
(45) Date of Patent: Apr. 28, 2026

(54) STRUCTURE OF MAGNETO-ELECTRIC DIPOLE ARRAY ANTENNA WITH INCLINED BRIDGE STRUCTURE

(71) Applicant: THE INDUSTRY & ACADEMIC COOPERATION IN CHUNGNAM NATIONAL UNIVERSITY (IAC), Daejeon (KR)

(72) Inventors: Young-Kyun Cho, Daejeon (KR); Su-Jeong Yun, Daejeon (KR); Ka-Hyeon Lee, Daejeon (KR)

(73) Assignee: The Industry & Academic Cooperation Foundation in Chungnam National University (IAC), Daejeon (KR)

( * ) Notice: Subject to any disclaimer, the term of this patent is extended or adjusted under 35 U.S.C. 154(b) by 78 days.

(21) Appl. No.: 18/884,057

(22) Filed: Sep. 12, 2024

(65) Prior Publication Data

US 2025/0226580 A1 Jul. 10, 2025

(51) Int. Cl.
*H01Q 21/06* (2006.01)
*H01Q 5/364* (2015.01)

(52) U.S. Cl.
CPC ........... *H01Q 21/062* (2013.01); *H01Q 5/364* (2015.01)

(58) Field of Classification Search
CPC ........ H01Q 1/2283; H01Q 5/364; H01Q 9/16; H01Q 21/0037; H01Q 21/0043; H01Q 21/005; H01Q 21/06; H01Q 21/061; H01Q 21/062; H01Q 21/08
See application file for complete search history.

(56) References Cited

U.S. PATENT DOCUMENTS

2023/0075273 A1* 3/2023 Ng ....................... H01Q 19/108

FOREIGN PATENT DOCUMENTS

KR 10-2013-0022629 A 3/2013

* cited by examiner

*Primary Examiner* — Robert Karacsony
(74) *Attorney, Agent, or Firm* — You & IP, LLC

(57) ABSTRACT

Proposed is a structure of a Magneto-Electric Dipole (MED) array antenna with an inclined bridge structure. More particularly, the structure of the MED array antenna may have a wide impedance bandwidth characteristic through an additional resonance point by changing an MED having a conventional post shape to an Inclined Bridge-Connected (IBC) MED, may improve a gain flatness characteristic due to a stable radiation pattern over an operation frequency band, may improve a resonance in a low frequency band by manufacturing the IBC posts in a symmetrical structure, may improve a resonance in a low frequency band by adding a rounded bridge, may generate magnetic dipoles by each current induced between the IBC posts and between the IBC post and a cavity forms loops, and may improve a resonance in a middle frequency band and in a high frequency band by applying an angle difference of xx to the IBC post.

8 Claims, 5 Drawing Sheets

STRUCTURE OF MAGNETO-ELECTRIC DIPOLE ARRAY ANTENNA WITH INCLINED BRIDGE STRUCTURE

CROSS REFERENCE TO RELATED APPLICATION

The present application claims priority to Korean Patent Application No. 10-2024-0002913, filed Jan. 8, 2024, the entire contents of which are incorporated herein for all purposes by this reference.

BACKGROUND OF THE INVENTION

Field of the Invention

The present disclosure relates to a structure of a Magneto-Electric Dipole (MED) array antenna with an inclined bridge structure, the structure of the MED array antenna being manufactured by changing an MED having a conventional rectangular prism (post) shape to an Inclined Bridge-Connected (IBC) MED for a broadband characteristic so that a wide impedance bandwidth characteristic is capable of being realized through an additional resonance point, the structure of the MED array antenna being further manufactured such that each post in the IBC MED has a symmetrical structure so that a gain flatness characteristic is capable of being improved due to a stable radiation pattern over an operation frequency band, the structure of the MED array antenna adding a rounded bridge in the IBC MED such that a current ($J_E$) at an upper end is distributed in a diagonal direction and an effect of expanding a length ($L_D$) of an electric dipole (E-dipole) is realized so that a resonance in a low frequency band is capable of being improved, the structure of the MED array antenna being configured such that each current ($J_{M1}$ and $J_{M2}$) respectively induced between the IBC posts and between the IBC post and a cavity forms loops so that magnetic dipoles (M-dipoles which are $M_1$ and $M_2$) are capable of being generated, and the structure of the MED array antenna being configured such that an angle difference of α is applied to the post such that lengths of the loops forming the M-dipoles are changed to a loop 1 and a loop 2 so that a resonance in a middle frequency band and a resonance in a high frequency band are capable of being improved.

Description of the Related Art

A Magneto-Electric Dipole (MED) antenna is attracting attention as an alternative plan that can solve a strict requirement of 5G millimeter wave communication. The MED antenna is an antenna in which a magnetic dipole (M-dipole) and an electric dipole (E-dipole) are coupled, and basically has characteristics of wide bandwidth, high gain, and a stable radiation pattern. In a millimeter wave band, much research has been conducted to expand a bandwidth by using the MED antenna in order to support multiple users and multiple devices simultaneously.

FIGS. 1A and 1B are views illustrating a conventional structure of the MED antenna. This structure includes four rectangular prisms (posts) 1 and a cavity 2, an upper end of the post 1 is operated as an E-dipole, and a distance between the posts 1 and a distance between the posts 1 and the cavity 2 are operated as M-dipoles.

A resonant frequency of the MED in FIG. 1A and FIG. 1B is determined by a length (L) of the E-dipole and a height (H) of the M-dipole. At this time, L is designed by $\lambda_0/2$, and H is designed by $\lambda_0/4$ ($\lambda_0$ is a wavelength in air). Therefore, when a general shape is designed, a resonance occurs in $\lambda_0/2$ and $\lambda_0/4$, so that a resonance occurs only in a specific band.

Meanwhile, one of methods commonly used so as to improve a bandwidth is to add a structure such as a parasitic patch, a T-shaped metal plate, a strip, and so on to the MED. In this manner, a broadband characteristic may be realized, but there is a problem that performance degradation such as unstable radiation pattern, difficulty in manufacturing, low gain, and so on is accompanied.

Therefore, a structure of an MED array antenna with an inclined bridge structure is urgently required, the structure of the MED array antenna being manufactured by changing an MED having a conventional rectangular prism (post) shape to an Inclined Bridge-Connected (IBC) MED for a broadband characteristic so that a wide impedance bandwidth characteristic is capable of being realized through an additional resonance point, the structure of the MED array antenna being further manufactured such that each post in the IBC MED has a symmetrical structure so that a gain flatness characteristic is capable of being improved due to a stable radiation pattern over an operation frequency band, the structure of the MED array antenna adding a rounded bridge in the IBC MED such that a current ($J_E$) at an upper end is distributed in a diagonal direction and an effect of expanding a length ($L_D$) of an electric dipole (E-dipole) is realized so that a resonance in a low frequency band is capable of being improved, the structure of the MED array antenna being configured such that each current ($J_{M1}$ and $J_{M2}$) respectively induced between the IBC posts and between the IBC post and a cavity forms loops so that magnetic dipoles (M-dipoles which are $M_1$ and $M_2$) are capable of being generated, and the structure of the MED array antenna being configured such that an angle difference of α is applied to the post such that lengths of the loops forming the M-dipoles are changed to a loop 1 and a loop 2 so that a resonance in a middle frequency band and a resonance in a high frequency band are capable of being improved.

DOCUMENT OF RELATED ART (Patent Document 1) KR 10-2013-0022629A (Mar. 7, 2013)

SUMMARY OF THE INVENTION

Accordingly, the present disclosure has been made keeping in mind the above problems occurring in the related art, and an objective of the present disclosure is to provide a structure of a Magneto-Electric Dipole (MED) array antenna being manufactured by changing an MED having a conventional rectangular prism (post) shape to an Inclined Bridge-Connected (IBC) MED for a broadband characteristic so that a wide impedance bandwidth characteristic is capable of being realized through an additional resonance point.

Another objective of the present disclosure is to provide a structure of an MED array antenna being manufactured such that each post in an IBC MED has a symmetrical structure so that a gain flatness characteristic is capable of being improved due to a stable radiation pattern over an operation frequency band.

Still another objective of the present disclosure is to provide a structure of an MED array antenna adding a rounded bridge in an IBC MED such that a current ($J_E$) at an upper end is distributed in a diagonal direction and an effect of expanding a length ($L_D$) of an electric dipole (E-dipole) is realized so that a resonance in a low frequency band is capable of being improved.

Yet another objective of the present disclosure is to provide a structure of an MED array antenna being configured such that each current ($J_{M1}$ and $J_{M2}$) respectively induced between IBC posts and between the IBC post and a cavity forms loops so that magnetic dipoles (M-dipoles which are $M_1$ and $M_2$) are capable of being generated.

Yet another objective of the present disclosure is to provide a structure of an MED array antenna being configured such that an angle difference of α is applied to a post such that lengths of loops forming M-dipoles are changed to a loop 1 and a loop 2 so that a resonance in a middle frequency band and a resonance in a high frequency band are capable of being improved.

In order to achieve the objectives described above, according to the present disclosure, there is provided a structure of a Magneto-Electric Dipole (MED) array antenna with an inclined bridge structure, the structure of the MED array antenna including: two Inclined Bridge-Connected (IBC) posts, each having center portion of rounded bridge, the two IBC posts being symmetrically spaced apart from each other by a predetermined distance; and a cavity having four surfaces spaced apart from the IBC post by a predetermined distance.

According to the present disclosure, a length ($L_D$) of an electric dipole (E-dipole) may be relatively longer than $\lambda_0/2$ by the rounded bridges.

According to the present disclosure, heights ($H_L$, $H_H$) of each magnetic dipole (M-dipole) may be respectively shorter and longer than $\lambda_0/4$ by applying a height difference of α to the IBC post.

According to the present disclosure, since each of the rounded bridges is added, current at an upper end of the IBC MED may be distributed in a diagonal direction as $J_E$ and an effect of expanding a length ($L_D$) of an electric dipole (E-dipole) may be realized, resulting in improving a resonance in a low frequency band.

According to the present disclosure, each M-dipole ($M_1$ and $M_2$) may be generated of each loop by each current ($J_{M1}$, $J_{M2}$) induced between the IBC posts and between the IBC post and the cavity.

According to the present disclosure, since an angle difference of α is applied to the IBC post such that each length of each loop forming each magnetic dipole (M-dipole) is respectively changed to a loop 1 and a loop 2, resulting in improving a resonance in a middle frequency band and a resonance in a high frequency band.

According to the present disclosure, since each of the IBC posts has a similar radiation pattern characteristic in an E-plane and in an H-plane due to a symmetrical structural change, a maximum gain may be maintained as much as a conventional structure and also a gain flatness may be improved as much as a matched band.

According to the present disclosure, since the structure of the MED array antenna with the inclined bridge structure is capable of being applied to various antenna structures, the structure of the MED array antenna having a broadband characteristic may be highly utilizable.

As described above, the structure of the MED array antenna with the inclined bridge structure has the following effects.

First, in the present disclosure, since the structure of the MED array antenna is manufactured by having the conventional rectangular prism (post) shape to the Inclined Bridge-Connected (IBC) MED for the broadband characteristic, the wide impedance bandwidth characteristic is capable of being realized through the additional resonance point.

Second, in the present disclosure, since the structure of the MED array antenna is manufactured such that each post in the IBC MED has the symmetrical structure, the gain flatness characteristic is capable of being improved due to the stable radiation pattern over the operation frequency band.

Third, in the present disclosure, since the structure of the MED array antenna adds the rounded bridge in the IBC MED such that the current ($J_E$) at the upper end is distributed in the diagonal direction and the effect of expanding the length ($L_D$) of the electric dipole (E-dipole) is realized, the resonance in the low frequency band is capable of being improved.

Fourth, in the present disclosure, since the structure of the MED array antenna is configured such that each current ($J_{M1}$ and $J_{M2}$) respectively induced between the IBC posts and between the IBC post and the cavity forms the loops, the magnetic dipoles (M-dipoles which are $M_1$ and $M_2$) are capable of being generated.

Fifth, in the present disclosure, since the structure of the MED array antenna is configured such that the angle difference of α is applied to the post such that the lengths of the loops forming the M-dipoles are changed to the loop 1 and the loop 2, the resonance in the middle frequency band and the resonance in the high frequency band are capable of being improved.

BRIEF DESCRIPTION OF THE DRAWINGS

The above and other objectives, features, and other advantages of the present disclosure will be more clearly understood from the following detailed description when taken in conjunction with the accompanying drawings, in which:

(FIG. 2A illustrates a perspective view, FIG. 2B illustrates a plan view, and FIG. 2C illustrates a front view) of an Inclined Bridge-Connected (IBC) MED antenna according to an embodiment of the present disclosure;

DETAILED DESCRIPTION OF THE INVENTION

An exemplary embodiment of the present disclosure will be described with reference to the accompanying drawings. In describing the present disclosure, the detailed descriptions of known art or component which is related to the present disclosure will be omitted when it may make the subject matter of the present disclosure unclear unnecessarily. Furthermore, technical terms, as will be mentioned hereinafter, are terms defined in consideration of their function in the present disclosure, which may vary according to the intention of users or operators, practice, or the like. Accordingly, the definitions of the terms will be given on the basis of the content to describe a structure of a magneto-electric dipole array antenna with an inclined bridge structure throughout the specification.

Hereinafter, a structure of a Magneto-Electric Dipole (MED) array antenna with an inclined bridge structure according to an exemplary embodiment of the present disclosure will be described in detail with reference to the accompanying drawings.

Figure 1A:
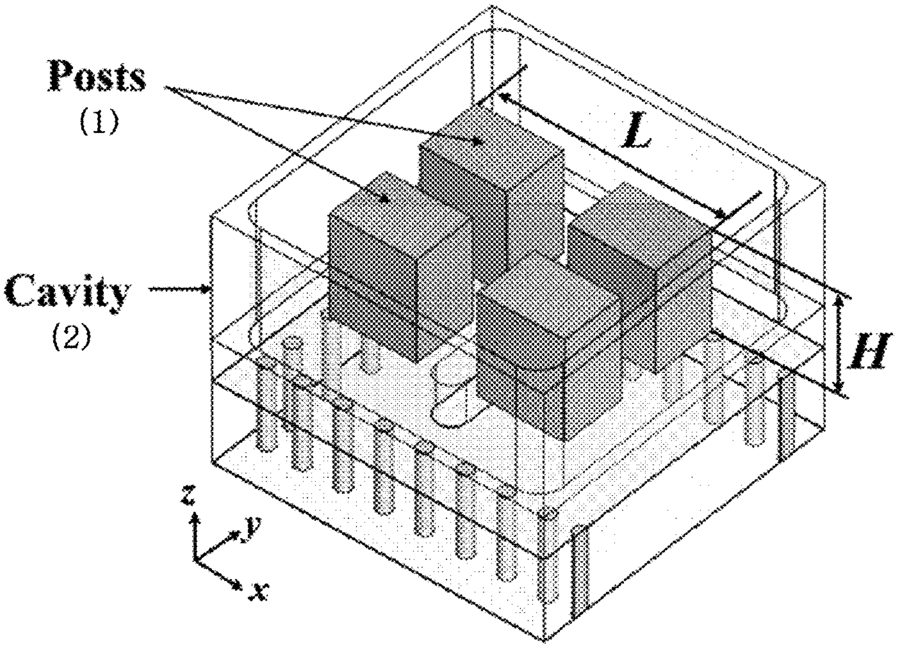
FIGS. 1A and 1B are views illustrating a structure of a conventional Magneto-Electric Dipole (MED) antenna.
Figure 1B:
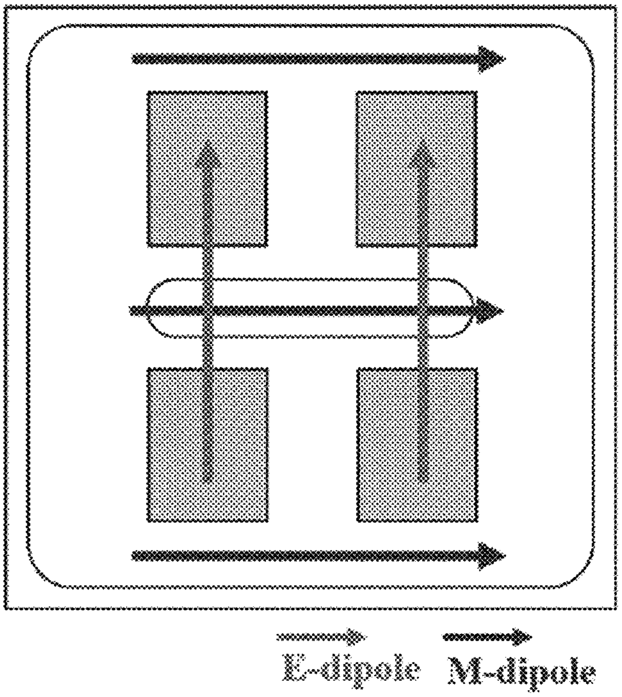
Figure 2A:
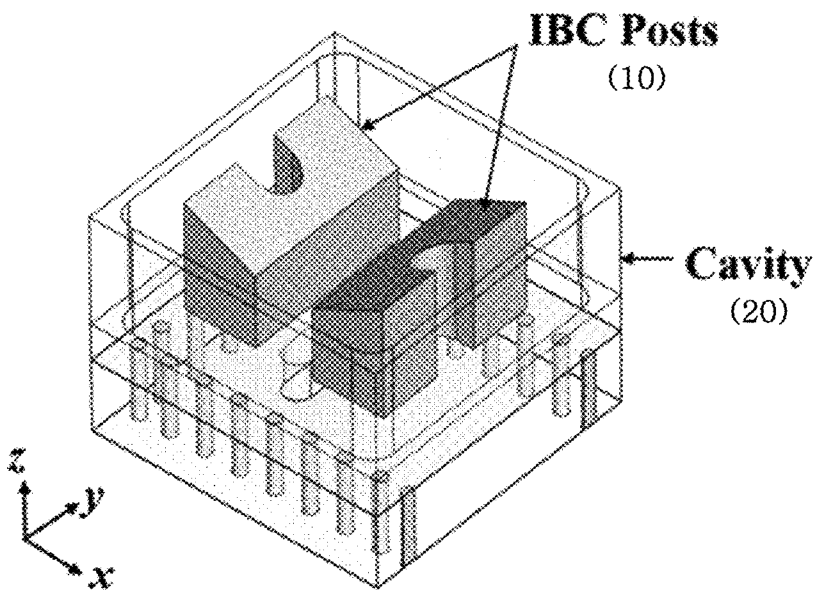
FIG. 2A to 2C are views illustrating a structure
Figure 2B:
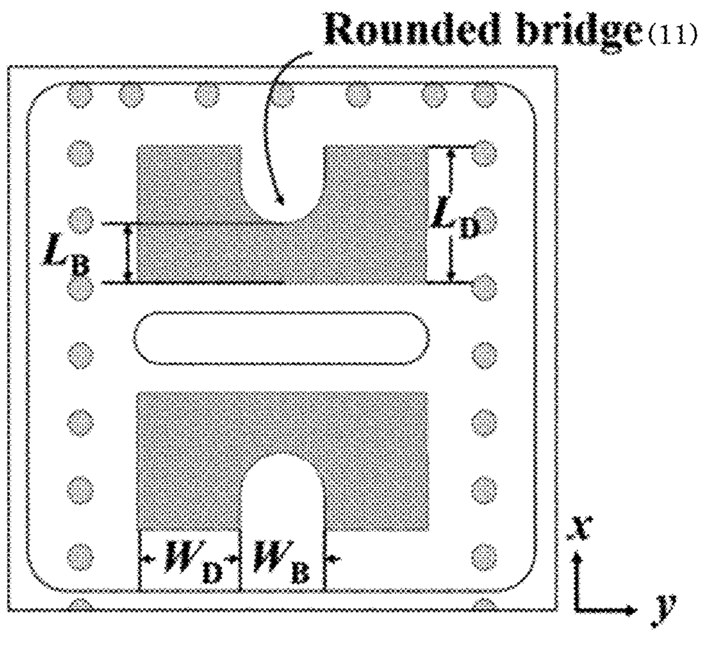
Figure 2C:
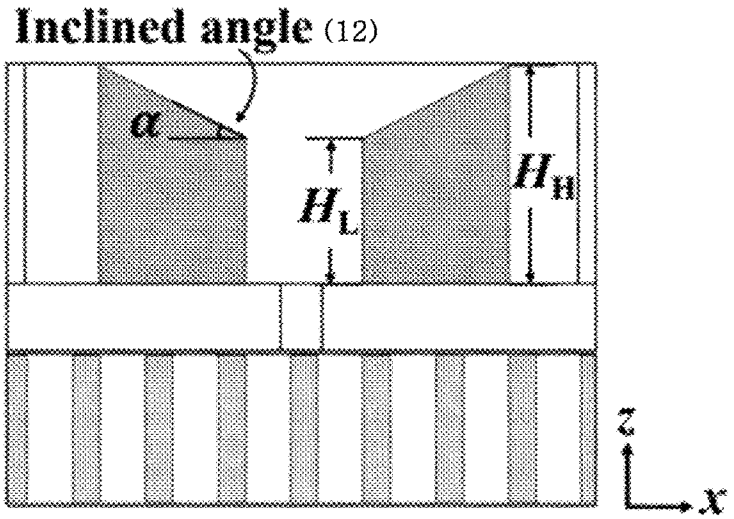
Figure 3:
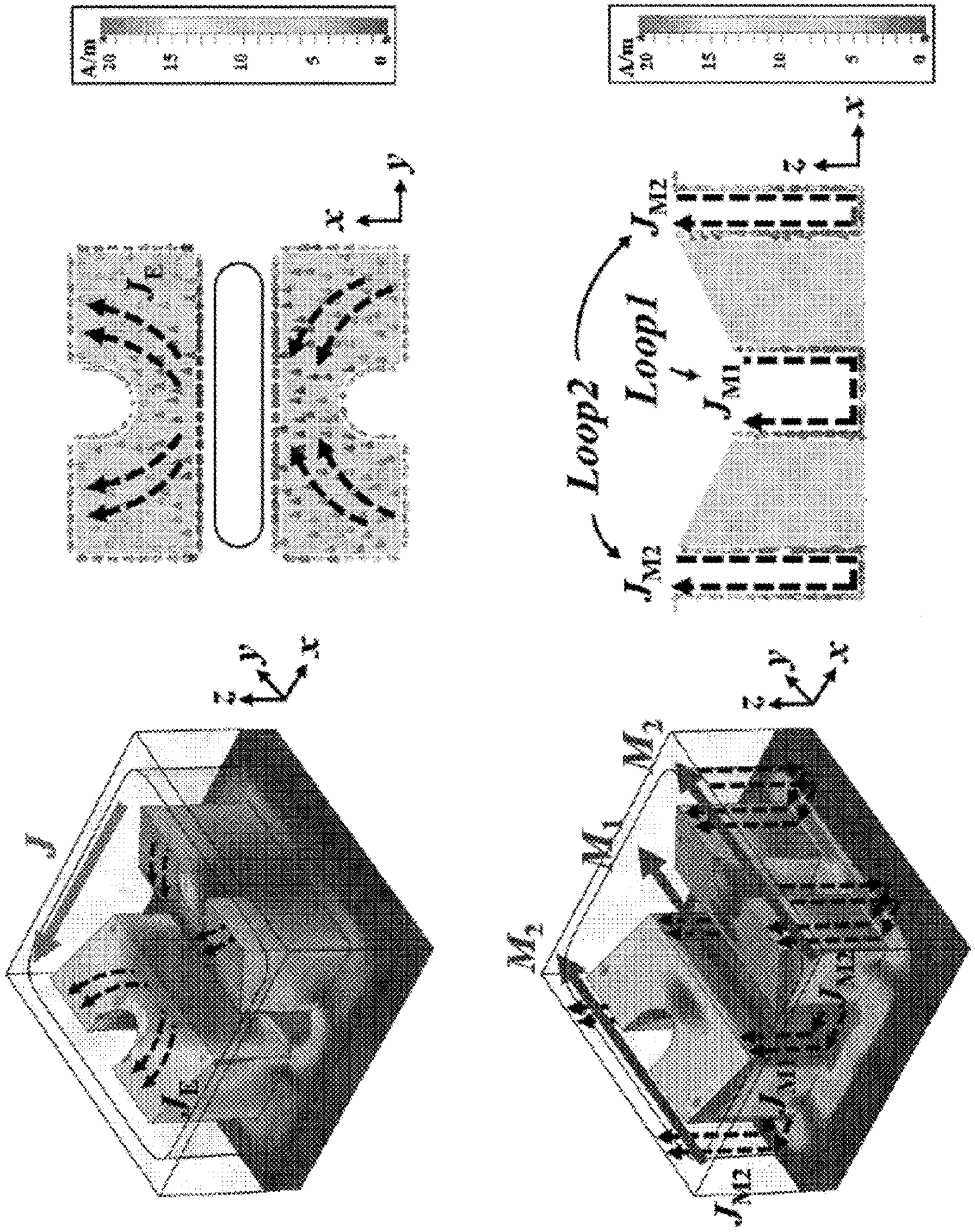
FIG. 3 is a view illustrating an operation principle of the IBC MED antenna according to an embodiment of the present disclosure.
Figure 4A:
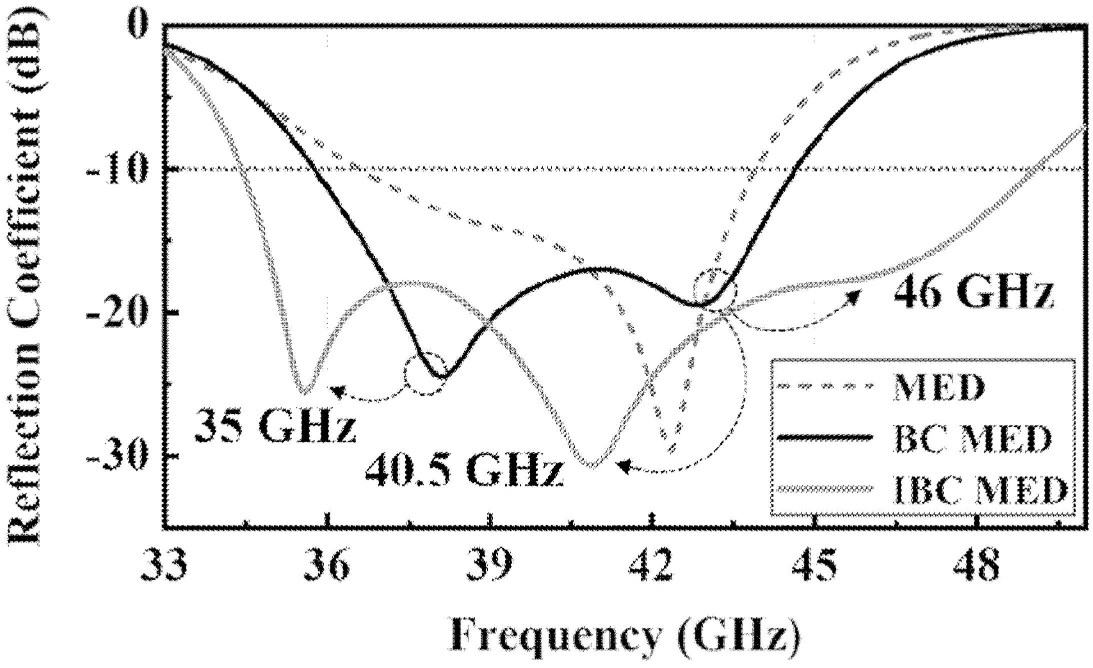
FIGS. 4A and 4B show graphs illustrating a performance improvement effect of the IBC MED antenna according to an embodiment of the present disclosure.
Figure 4B:
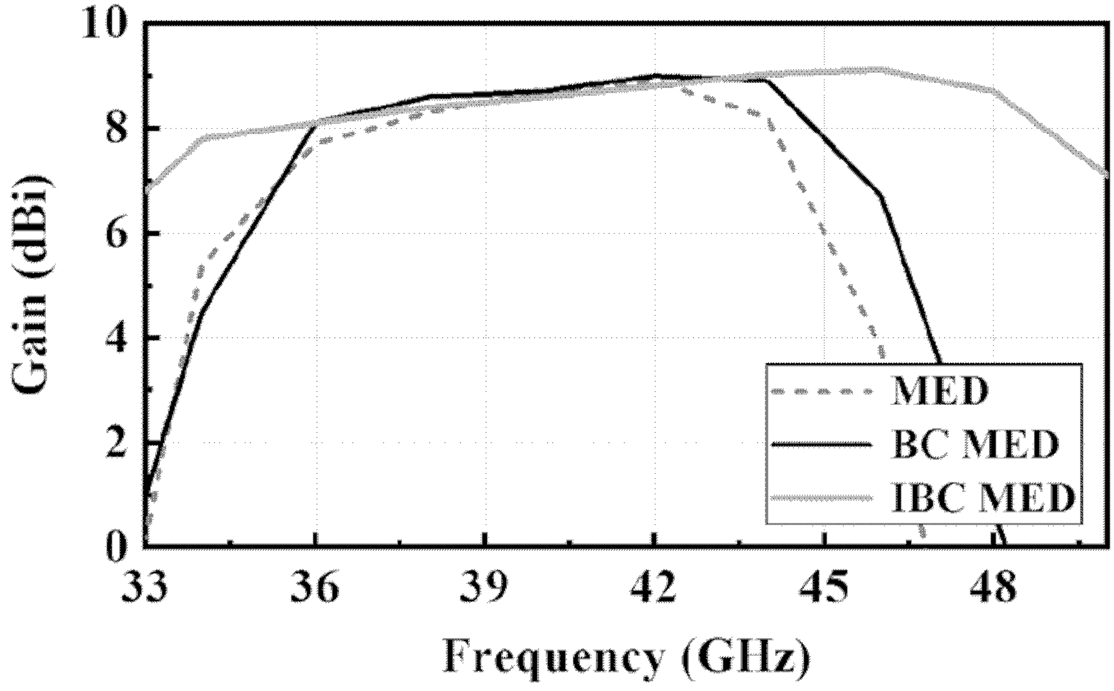

FIG. 2A to 2C are views illustrating a structure (FIG. 2A illustrates a perspective view, FIG. 2B illustrates a plan view, and FIG. 2C illustrates a front view) of an Inclined Bridge-Connected (IBC) MED antenna according to an embodiment of the present disclosure, FIG. 3 is a view illustrating an operation principle of the IBC MED antenna according to an embodiment of the present disclosure, and FIGS. 4A and 4B show graphs illustrating a performance improvement effect of the IBC MED antenna according to an embodiment of the present disclosure.

A structure of an MED array antenna with an inclined bridge structure of the present disclosure includes an Inclined Bridge-Connected (IBC) post (rectangular prism) 10, a rounded bridge 11, an inclined angle 12, a cavity 20, and so on.

As illustrated in FIGS. 2A to FIG. 3, the structure of the MED array antenna with the inclined bridge structure is provided with: two IBC posts 10, having center portion of the rounded bridge 11, the two IBC posts 10 being symmetrically spaced apart from each other by a predetermined distance; and the cavity 20 having four surfaces spaced apart from the IBC post 10 by a predetermined distance.

A function of each technical mechanism constituting the structure of the MED array antenna with the inclined bridge structure of the present disclosure will be described as follows.

The IBC post 10 includes the two IBC posts 10, the two rounded bridges 11 are formed respectively at the center portions of the first sides of the two IBC posts 10, and the two IBC posts 10 are spaced apart from each other by the predetermined distance and have the symmetrical structure shape.

The cavity 20 is formed on four surfaces, and is spaced apart from the IBC post 10 by the predetermined distance.

As illustrated in FIGS. 2A to 2C, in the IBC MED antenna of the present disclosure, a length ($L_D$) of an electric dipole (E-dipole) is relatively longer than $\lambda_0/2$ by the rounded bridge 11. In addition, by giving a height difference of $\alpha$ that is the inclined angle 12 to the IBC post 10, heights ($H_L$, $H_H$) of magnetic dipoles (M-dipoles) are shorter and longer than $\lambda_0/4$, respectively. Through this, a resonance may occur over a wider band.

As illustrated in FIG. 3, an operation principle in which a bandwidth of the IBC MED antenna of the present disclosure is improved is illustrated. The E-dipole (J) is generated by current ($J_E$) that flows on an upper end of the dipole.

In a general MED structure, current at an upper end of the dipole flows in a rectilinear direction. In the IBC MED, since the rounded bridge is added, the current ($J_E$) at the upper end is distributed in a diagonal direction. This has an effect of expanding the length ($L_D$) of the E-dipole, so that a resonance in a low frequency band may be improved. The M-dipoles ($M_1$ and $M_2$) are generated of each loops by each current ($J_{M1}$, $J_{M2}$) induced between the IBC posts and between the IBC post and the cavity. Since an angle difference of $\alpha$ is applied to the post, lengths of the loops forming the M-dipoles are changed to a loop 1 and a loop 2, respectively. Therefore, a resonance in a middle frequency band and a resonance in a high frequency band may be improved.

As a result, by the IBC MED structure, each resonance point of the E-dipole and the M-dipoles is capable of being adjusted, so that a matching band is capable of being expanded. In addition, in the present disclosure, due to a symmetrical structural change, a similar radiation pattern characteristic is realized in an E-plane and an H-plane. Therefore, in the present disclosure, the maximum gain is capable of being maintained as much as in the conventional structure and also a gain flatness is capable of being improved as much as a matched band.

As illustrated in FIGS. 4A and 4B, a performance improvement effect of the IBC MED antenna is illustrated. When the structure proposed in the present disclosure is designed, as illustrated in FIG. 4A, bandwidth characteristics of an MED and a Bridge-Connected (BC) MED have been improved from 17.9% to 21.3% and bandwidth characteristics of an IBC MED have been improved from 17.9% to 36.28, and stable matching characteristics are shown in the IBC MED over a wide band. In addition, as illustrated in FIG. 4B, it can be seen that the gain flatness characteristic is improved while the maximum gain is not reduced in the IBC MED.

As described above, those of ordinary knowledge in the art to which the present disclosure pertains will appreciate that various substitutions, modifications, and alterations are possible, without departing from the technical spirit of the present disclosure, and thus, the patent right of the present disclosure is not limited to the exemplary embodiment described above and the accompanying drawings.

As described above, since the structure of the magneto-electric dipole array antenna having the inclined bridge structure of the present disclosure may be applied to various antenna structures, the proposed present disclosure having the broadband characteristic is highly utilizable.

What is claimed is:

1. A structure of an inclined bridge-connected (IBC) magneto-electric dipole (MED) antenna comprising:

two IBC posts, each having a center portion of a rounded bridge, the two IBC posts being symmetrically spaced apart from each other by a predetermined distance; and a cavity having four surfaces spaced apart from the IBC posts by a predetermined distance.

2. The structure of the IBC MED antenna of claim 1, wherein a length ($L_D$) of an electric dipole (E-dipole) is relatively longer than $\lambda_0/2$ by the rounded bridges.

3. The structure of the IBC MED antenna of claim 1, wherein heights ($H_L$, $H_H$) of magnetic dipoles (M-dipoles) are respectively shorter and longer than $\lambda_0/4$, wherein an inclined angle $\alpha$ of the two IBC posts is formed by a height difference between $H_L$ and $H_H$.

4. The structure of the IBC MED antenna of claim 1, wherein the rounded bridges are arranged such that current ($J_E$) at an upper end of the IBC MED antenna is distributed in a diagonal direction as $J_E$ and an effect of expanding a length ($L_D$) of an electric dipole (E-dipole) is realized, resulting in improving a resonance in a low frequency band.

5. The structure of the IBC MED antenna of claim 3, wherein each M-dipole ($M_1$ and $M_2$) is generated of each loop by each current ($J_{M1}$, $J_{M2}$) induced between the IBC posts and between the IBC posts and the cavity.

6. The structure of the IBC MED antenna of claim 5, wherein the inclined angle $\alpha$ of the IBC posts are arranged such that each length of each loop forming each magnetic dipole (M-dipole) is respectively changed to a loop 1 and a loop 2, resulting in improving a resonance in a middle frequency band and a resonance in a high frequency band.

7. The structure of the IBC MED antenna of claim 1, wherein the IBC posts are structurally symmetrical such that a similar radiation pattern characteristic in an E-plane and in an H-plane is realized and a maximum gain is capable of being maintained and also a gain flatness is capable of being improved.

8. The structure of the IBC MED antenna of claim 1, wherein the structure of the IBC MED antenna has a broadband characteristic.

* * * * *